United States Patent
Riemers

(10) Patent No.: US 6,615,242 B1
(45) Date of Patent: Sep. 2, 2003

(54) AUTOMATIC UNIFORM RESOURCE LOCATOR-BASED MESSAGE FILTER

(75) Inventor: Bill C. Riemers, Eatontown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/474,009

(22) Filed: Dec. 28, 1999

Related U.S. Application Data

(60) Provisional application No. 60/113,975, filed on Dec. 28, 1998.

(51) Int. Cl.[7] .............................................. G06F 15/16
(52) U.S. Cl. ....................... 709/206; 709/225
(58) Field of Search ............................... 709/206, 225, 709/207, 229

(56) References Cited

U.S. PATENT DOCUMENTS

| | | | | |
|---|---|---|---|---|
| 5,996,011 A | * | 11/1999 | Humes | 709/206 |
| 6,052,709 A | * | 4/2000 | Paul | 709/202 |
| 6,112,181 A | * | 8/2000 | Shear et al. | 705/1 |
| 6,138,149 A | * | 10/2000 | Ohmura | 705/26 |
| 6,161,130 A | * | 12/2000 | Horvitz et al. | 707/5 |
| 6,240,391 B1 | * | 5/2001 | Ball et al. | 379/93.24 |
| 6,393,465 B2 | * | 5/2002 | Leeds | 709/206 |
| 6,421,675 B1 | * | 7/2002 | Ryan et al. | 707/100 |
| 6,539,430 B1 | * | 3/2003 | Humes | 709/225 |

\* cited by examiner

*Primary Examiner*—Mehmet B. Geckil

(57) ABSTRACT

A system and method for filtering messages to identify spam. A Uniform Resource Locator (URL) is identified in a message, and information is fetched from the site designated by the URL. The fetched information is analyzed to determine if the message that includes the URL is spam. If the message is spam, then a message filtering action is performed, such as deleting the message, displaying the message to the recipient with a flag, and sending the message to a third party.

43 Claims, 2 Drawing Sheets

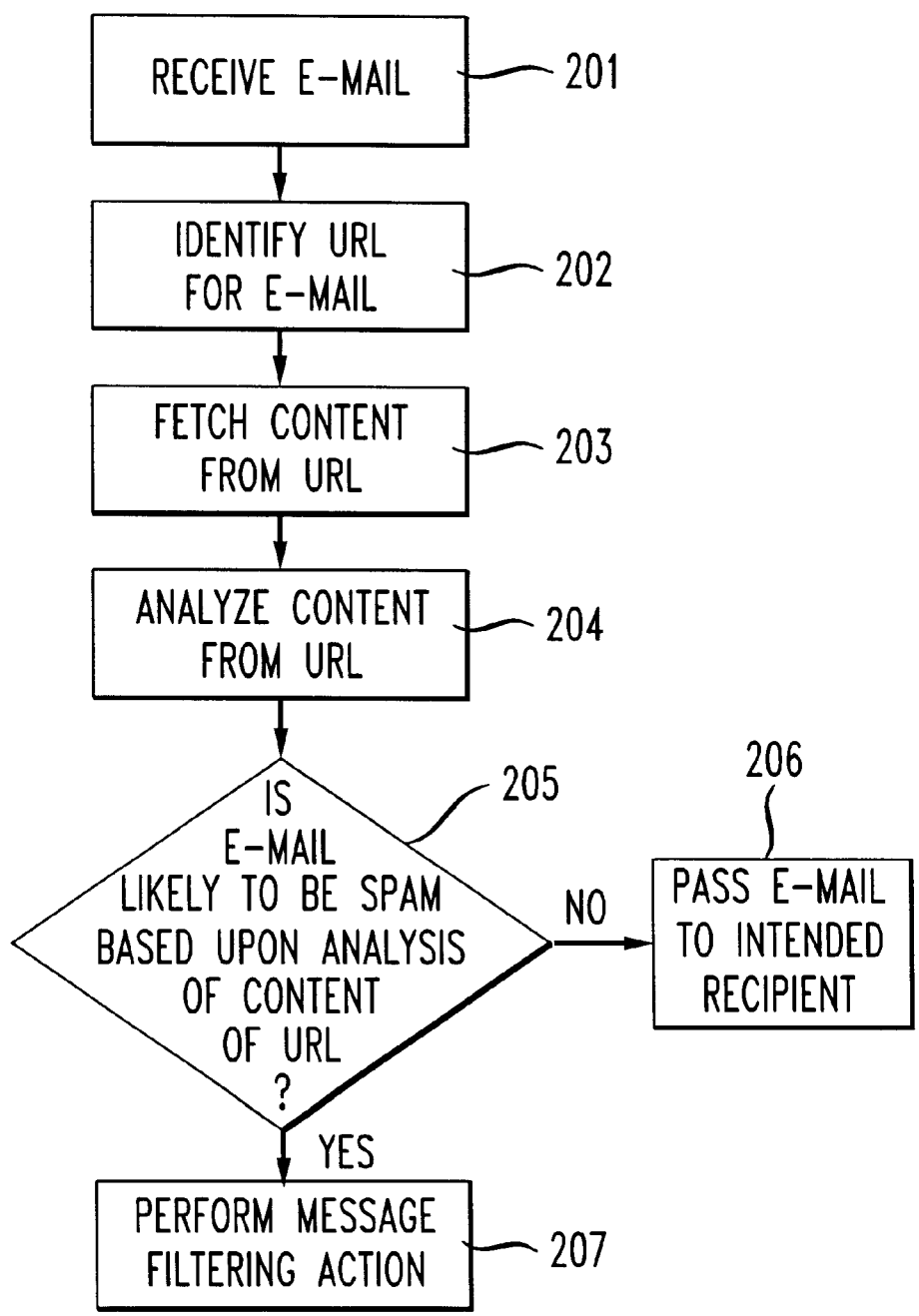

AUTOMATIC UNIFORM RESOURCE LOCATOR-BASED MESSAGE FILTER

CROSS-REFERENCE TO RELATED APPLICATIONS

This application claims the benefit of U.S. provisional application No. 60/113,975, filed on Dec. 28, 1998.

BACKGROUND OF THE INVENTION

Spam is unsolicited, typically commercial electronic mail ("e-mail"). It clutters e-mail boxes, undesirably occupies space in computer memory (e.g., on a hard disk), and is generally a nuisance.

A known general approach to handling spam is called filtering. Filtering includes techniques designed to distinguish a spam message from a message that is not spam, and to dispose of a message identified as spam in a particular fashion (e.g., automatically deleting it, flagging it, etc.)

A known technique for filtering spam from other types of e-mail is performed at least partly in a manual fashion by a spam recipient and a system administrator. Upon receiving and identifying a message as spam (e.g., by reading it), the recipient forwards a copy of the message to the system administrator, indicating to the administrator that the message is spam. The administrator reads at least part of the spam message (e.g., the header, the body, etc.) and identifies at least one string (a "spam string") in the header and/or body that is likely to be reproduced in other spam messages. The header of an e-mail includes addressing and subject information. The body includes the text of the message. Examples of a spam string include the address of the sender (e.g., "grthibault@specmorl.com"), a Uniform Resource Locator (e.g., "http://www.sellmore.com"), or a text string "make $$$ wile working at home!"

The system administrator places a spam string in a file or database. Subsequent incoming e-mail messages are searched for the occurrence of a spam string that is included in the administrator's spam string database. If such a string is found in an incoming e-mail message, the message is blocked, and is not delivered to its intended recipient.

Although this known filtering system and method can identify and block spam, it is disadvantageously time consuming on the part of both the user-recipient of the spam, who has to read at least part of the spam, and then forward it to the administrator. This known system is also disadvantageously time-consuming for the system administrator, who also has to read at least part of the spam, identify a spam string, and then enter it in a spam string database. Further, this known system can be circumvented by the spam sender by varying the source address and text strings inside its spam.

BRIEF DESCRIPTION OF THE DRAWINGS

FIG. 2 shows the method in accordance with an embodiment of the present invention.

DETAILED DESCRIPTION

Figure 1:
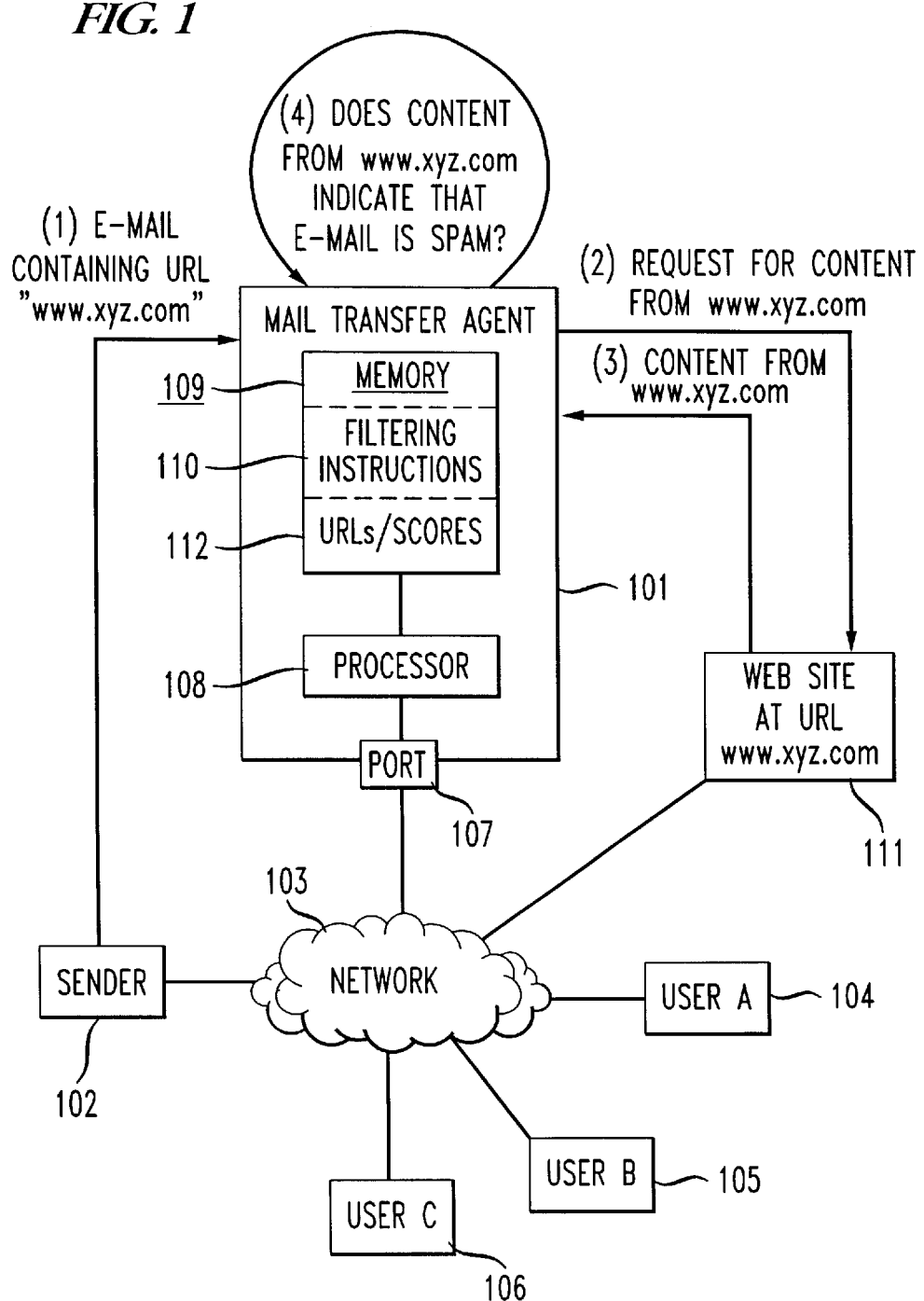
FIG. 1 shows a system in accordance with an embodiment of the present invention.

An embodiment in accordance with the present invention provides a spam filtering system that is advantageously automatic and efficient, and provides filtering that requires substantially less manual intervention by the system administrator and the spam recipient. The method in accordance with an embodiment of the present invention includes receiving an e-mail message, identifying a Uniform Resource Locator included in the message, fetching information from the site designated by the Uniform Resource Locator, and then analyzing the fetched information to determine the likelihood that the e-mail message that contained the URL is spam.

FIG. 1 shows a system in accordance with an embodiment of the present invention. A sender 102 of a message and a mail transfer agent 101 (e.g., e-mail server, e-mail proxy, etc.) are coupled to a network 103, as is a web site at the URL www.xyz.com 111. The mail transfer agent acts as a proxy and a message filter for users A 104, B 105 and C 106, each of which are coupled to the mail transfer agent 101. As used in reference to FIG. 1, the term "user" means a computer, typically operated by a human recipient. An embodiment of the user computer includes a user memory coupled to a user processor, which is adapted to be coupled to a network. As used herein, the term "coupled" means "directly or indirectly connected." Thus, if A is connected to B, and B is connected to C, then A is said to be "coupled" to B, and A is also said to be "coupled" to C.

In accordance with an embodiment of the present invention, sender 102 sends a message that is intended to be delivered to a user (e.g., user A 104) through network 103. The message is received by mail transfer agent 101. Mail transfer agent 101 analyzes the message using the method in accordance with an embodiment of the present invention, and determines if the message is likely to be spam. For example, the mail transfer agent 101 detects the URL "www.xyz.com" in the received e-mail message, sends a request to the web site at the URL www.xyz.com 111, receives information from the website 111 in response to the request, analyzes the information received from the website, and based upon this analysis, determines the likelihood that the received e-mail message is unsolicited commercial e-mail (spam). In one embodiment, the mail transfer agent 101 deletes a message if there is a likelihood above a certain threshold that the message is spam. In another embodiment, the mail transfer agent 101 forwards a message to the intended recipient along with an indication that the message may be spam.

FIG. 1 also shows an apparatus in accordance with an embodiment of the present invention. Mail transfer agent 101 includes a processor 108 and memory 109. The processor in one embodiment is a general purpose microprocessor, such as the Pentium III microprocessor manufactured by the Intel Corporation of Santa Clara, Calif. In another embodiment, the processor is an Application Specific Integrated Circuit (ASIC) which has been designed to implement in its hardware and/or firmware at least a part of the method in accordance with an embodiment of the present invention. An example of an ASIC is a digital signal processor.

Memory 109 is any device capable of storing digital information, such as Random Access Memory, Read Only Memory, a hard disk, flash memory, etc. At least part of memory 109 should be writeable. Memory 109 stores filtering instructions 110 adapted to be executed by processor 108 to perform the method in accordance with an embodiment of the present invention. Memory 109 is coupled to processor 108. The embodiment shown in FIG. 1 also includes a port 107 that is adapted to be coupled to a network. Other ports (not shown) can be adapted to be coupled to users (e.g., users A 104, B 105 and C 106).

Filtering instructions are adapted to be executed by processor 108 to automatically analyze information that corresponds to a Uniform Resource Locator (URL) included in a message, and perform a message filtering action based at least partly on the results of the analysis of the information. A URL, as used herein, is meant to encompass any network address. The discussion pertaining to the use of the specific network address designator called a URL is meant only to be an example that illustrates, but does not limit, the scope of the invention. In its general form, the invention includes identifying a network address included in a message, fetching information from the site designated by the network address, and analyzing the fetched information to determine the likelihood that the e-mail message that includes the network address is spam. Although a URL is not, strictly speaking, a network address itself, it is easily translated into a network address (and can also include directory, subdirectories and file names) using the Internet Domain Name System described in RFC 1035, available at http://www.crynwr.com/crynwr/rfc1035/rfc1035.html.

Identifying a URL in a message is known in the art; one need only search for strings in the message that conform to the well-known characteristics of URLs. For example, one could detect any string that is of the form ([Hh][Tt][Ff])[Tt][Pp]:[^]*; or [Ww][Ww][Ww][.][-A-Za-z0-9]+[.][-A-Za-z0-9]+([/]+) ([^])*; or [Ff][Tt][Pp][.][-A-Za-z0-9]+[.][-A-Za-z0-9]+([/]+)([^])*.

As used herein, information that "corresponds" to a URL means information that is stored at a location designated by the URL. Typically, such information will be in the form of a file. For example, the information corresponding to the URL http://www.xyz.com/home.html includes information stored in the file home.html, which is stored on a computer whose network address corresponds to the domain name xyz.com. A URL can correspond to a broader set of information, such as a collection of files called a website. Thus, in accordance with an embodiment of the present invention, the mail transfer agent scans an e-mail message, identifies a URL contained in the e-mail message, fetches information from the site designated by the URL, and then analyzes the fetched information to determine if the e-mail message is spam.

In one embodiment, the information is fetched from the site designated by the URL when the URL is detected in the message. This fetched information can be advantageously cached (stored locally), so that the site designated by the URL need not be contacted each time the URL is detected in a message. Thus, information that corresponds to a URL that has already been fetched and is stored on a database accessible to the mail transfer agent. This is especially advantageous for information that corresponds to a URL that occurs frequently in messages. In the case of cached information corresponding to a URL, the mail transfer agent can analyze the information by retrieving it from the database, rather than contacting the site designated by the URL. This advantageously avoids the necessity of having the mail transfer agent issue a request for the information to the location specified by the URL, which is often a remote site.

In one embodiment, the mail transfer agent analyzes the information corresponding to the URL by identifying a predetermined string (e.g., "contest", "games", "$$$", etc.) that occurs in the information. Each such predetermined string is assigned a predetermined string score. The string score can be advantageously adjusted to reflect the likelihood that the information in which the string occurs is acceptable, is spam, or to denote some other property of the information. For example, the string "sale" can be assigned a score of 50, while the string "$$$" can be a score of 200, where a higher score indicates a higher likelihood that the string is in a message that is spam.

A URL score is calculated for the URL based upon the scores of the predetermined strings found in the information corresponding to the URL. For example, the URL score is the highest string score of all of the predetermined strings found in the information corresponding to the URL. Alternatively, the URL score is the average of all string scores found. A string score can be multiplied by the number of times the string is found in the information, which can then be used in determining an overall URL score. The URL can be advantageously stored along with its score (e.g., in a database) for easy lookup when the URL is identified in other messages. In FIG. 1, these URLs and scores are shown stored 112 in memory 109.

Once the URLs in a message have been analyzed and scored, an overall message score is calculated for the message itself. The message score is based upon the URL scores, and can also be based upon the occurrence of predetermined strings in the message itself. The URL scores can be combined in any suitable way (e.g., maximum score, average score, etc.) that provides an indication of the overall acceptability of the message. There can be further consideration of the appearance of any predetermined string in the text of the message itself. These two sources of message scoring can be weighted differently. For example, a string that appears in the text of the message itself (e.g., "games") can be assigned a higher score than the same string is assigned in calculating the score of a URL.

In one embodiment, the filtering instructions are adapted to be executed on the processor to perform a message filtering action that includes delivering the message to its intended recipient along with an indication that the message may be spam. The indication may be a simple flag or highlighting that appears to a user in or near the message. Likewise, the user may receive a numerical or alphabetic score along with the message. This score is related to (or the same as) the message score calculated by the mail transfer agent.

The filtering instructions can advantageously be stored on a medium and distributed to mail transfer agents and/or users. Such a medium is any medium that is capable of storing digital information. For example, a Compact Disk Read Only Memory (CD-ROM), a floppy disk, a hard disk, flash memory, etc.

Although FIG. 1 shows an embodiment of the present invention that is implemented at a mail transfer agent 101, an embodiment of the present invention can also be implemented at the user, e.g., at user A 104. The user at which the present invention is implemented includes a processor and a memory with instructions arranged in a fashion that is isomorphic to the mail transfer agent 101 shown in FIG. 1. For example, filtering instructions can be stored in memory at user A 104. These filtering instructions are adapted to be executed by the processor at user A 104 to receive an e-mail message, identify a URL contained in the e-mail message, fetch information from the site designated by the URL, and analyze the fetched information to determine the likelihood that the received e-mail is spam. Any of the scoring techniques described above can also be implemented by the filtering instructions stored and executed at user A. Any of various actions can be taken if an e-mail message is determined likely to be spam. For example, the processor at user A can delete the message, flag the message, etc. This process can advantageously take place transparently to the recipient, i.e., without the recipient's intervention.

FIG. 2 is a flow chart that illustrates the method in accordance with the present invention. An e-mail message is received, step 201. A URL is identified in the message, step 202. Content is fetched from the site designated by the URL, step 203. The fetched content is analyzed, step 204. The analysis of the fetched content can include scanning for keywords, tallying the number of occurrences of predetermined strings, etc. The analysis can also include identifying a URL in this first fetched content (a first fetched content URL), fetching second content from the site designated by the first content URL, analyzing the second content, etc. This can be performed any number of times so that links within third, fourth, fifth, etc. content are identified and corresponding material is fetched and analyzed. The purpose of the analysis is to determine the likelihood that the received e-mail message is spam. Based upon the results of this analysis, a determination is made as to whether the message is likely to be spam, step 205. For example, as discussed above, a score can be compiled for a message based upon the scores determined for content corresponding to one or more URL's contained in the message.

If the score indicates that the e-mail has a low likelihood of being spam (e.g., below a predetermined threshold or probability), then the message is forwarded to its intended recipient. 206. If the score indicates that there is a substantial likelihood that the e-mail is spam (e.g., above a predetermined threshold or probability), then the a message filtering action is performed 207. In one embodiment, the message filtering action 207 is to delete the message. In another embodiment, the message is flagged, e.g., presented to the recipient with a graphic that indicates a likely spam, so that the recipient can advantageously skip reading that message, or manually delete it. In another embodiment, the message, or information about the message (e.g., the source address, the subject line, etc.) is sent to a third party. The third party can be a clearinghouse for information about spam, and can be used by mail transfer agents as a resource for identifying strings or other information useful in identifying spam.

The present invention provides an efficient and automatic way to filter a message by exploring the content of at least one site designated by at least one URL contained in the message.

What is claimed is:

1. A method for determining if an electronic message is spam including:

receiving a message;

identifying a URL included in the message;

fetching information corresponding to the identified URL; and determining the likelihood that the message is spam based upon an analysis of the fetched information.

2. The method of claim 1, wherein the message is an electronic mail message.

3. The method of claim 1, wherein the message is a file.

4. The method of claim 1, wherein the Uniform Resource Locator corresponds to a web site.

5. The method of claim 1, wherein the Uniform Resource Locator corresponds to a file on a remote computer.

6. The method of claim 1, wherein the information corresponding to the Uniform Resource Locator is retrieved from a database at which the information has been previously stored.

7. The method of claim 1, wherein the information corresponding to the Uniform Resource Locator is retrieved from a remote computer whose location is designated by the Uniform Resource Locator.

8. The method of claim 1, wherein the information corresponding to the Uniform Resource Locator is analyzed by:

a. identifying a predetermined string that occurs in the information, wherein the predetermined string has a string score; and b. calculating a Uniform Resource Locator score based at least partly on the string score of the predetermined string identified in the information.

9. The method of claim 8, wherein the Uniform Resource Locator score is proportionate to the maximum string score of identified predetermined strings in information from the site.

10. The method of claim 8, wherein the Uniform Resource Locator score is based upon the number of occurrences of a predetermined string in the site information.

11. The method of claim 8, wherein the Uniform Resource Locator score is proportionate to the average of the string scores of predetermined strings in the site information.

12. The method of claim 8, further including storing the Uniform Resource Locator score with the Uniform Resource Locator.

13. The method of claim 8, further including assigning a message score to the message, wherein the message score is based upon the Uniform Resource Locator score of a Uniform Resource Locator included in the message.

14. The method of claim 13, wherein the message score is proportionate to the maximum of the Uniform Resource Locator scores of Uniform Resource Locators identified in the message.

15. The method of claim 13, further including:

a. identifying a predetermined message string that occurs in the text of the message, wherein the predetermined message string has a message string score; and b. calculating the message score based at least partly on a message string score.

16. The method of claim 15, wherein the message score is proportionate to the maximum of the message string scores of predetermined message strings identified in the message.

17. The method of claim of claim 1, further including performing a message filtering action based upon the results of determining the likelihood that the message is spam, wherein the message filtering action includes preventing the message from being delivered to its intended recipient.

18. The method of claim 1, further including performing a message filtering action based upon the results of determining the likelihood that the message is spam, wherein the message filtering action includes delivering the message to its intended recipient along with an indication that the message may be spam.

19. The method of claim 1, further including performing a message filtering action based upon the results of determining the likelihood that the message is spam, wherein the message filtering action includes delivering a copy of the message to a third party.

20. An apparatus for determining if an electronic message is spam, comprising:

a processor; and a memory storing filtering instructions adapted to be executed by said processor to identify a URL in a message, fetch information corresponding to the URL, and automatically analyze the information to determine if the message in which the URL is included is likely to be spam, said memory coupled to said processor.

21. The apparatus of claim 20, wherein said filtering instructions are adapted to be executed by said processor to retrieve information corresponding to a Uniform Resource Locator from a remote computer through a network.

22. The apparatus of claim 20, wherein said filtering instructions are adapted to be executed by said processor to identify a predetermined string that occurs in the fetched information, wherein the predetermined string has a string score, and to calculate a Uniform Resource Locator score based at least partly on the string score of the predetermined string identified in the information.

23. The apparatus of claim 22, wherein said filtering instructions are adapted to be executed by said processor to store in said memory the Uniform Resource Locator score with the Uniform Resource Locator.

24. The apparatus of claim 22, wherein said filtering instructions are adapted to be executed by said processor to calculate a message score for the message, wherein the message score is based at least partly on the Uniform Resource Locator score of a Uniform Resource Locator included in the message.

25. The apparatus of claim 22, wherein said filtering instructions are adapted to be executed by said processor to identify a predetermined message string that occurs in the text of the message, wherein the predetermined message string has a message string score, and calculate a message score based at least partly on a message string score.

26. The apparatus of claim 25, wherein said filtering instructions are adapted to be executed by said processor to perform a message filtering action based upon the message score, wherein the message filtering action includes preventing a massage from being delivered to the intended recipient of the message.

27. The apparatus of claim 25, wherein said filtering instructions are apted to be executed by said processor to perform a message filtering action based upon the message score that includes delivering a message to the intended recipient of the message along with an indication that the message may include spam.

28. A medium storing instructions adapted to be executed by a processor to perform steps including:
 receiving a message;
 identifying a URL included in the message;
 fetching information corresponding to the identified URL;
 determining a message score based upon an analysis of the fetched information, wherein the message score relates the likelihood that the message is spam.

29. The medium of claim 28, wherein the message is an electronic mail message.

30. The medium of claim 28, wherein the message is a file.

31. The medium of claim 28, wherein the Uniform Resource Locator corresponds to a web site.

32. The medium of claim 28, wherein the Uniform Resource Locator corresponds to a file on a remote computer.

33. The medium of claim 28, wherein the information corresponding to the Uniform Resource Locator is retrieved from a database at which the information has been previously stored.

34. The medium of claim 28, wherein the information corresponding to the Uniform Resource Locator is analyzed by:
 identifying a predetermined string that occurs in the information, wherein the predetermined string has a string score; and
 calculating a Uniform Resource Locator score based at least partly on the string score of the predetermined string identified in the information.

35. The medium of claim 28, wherein the instructions are further adapted to be executed by the processor to store the Uniform Resource Locator score with the Uniform Resource Locator.

36. The medium of claim 28, wherein the message score is based upon the Uniform Resource Locator score of a Uniform Resource Locator included in the message.

37. The medium of claim 28, wherein the instructions are further adapted to be executed by a processor to perform a message filtering action based upon the results of determining the likelihood that the message is spam, wherein the message filtering action includes preventing the message from being delivered to its intended recipient.

38. The medium of claim 28, wherein the instructions are further adapted to be executed by the processor to perform a message filtering action based upon the results of determining the likelihood that the message is spam, wherein the message filtering action includes delivering the message to its intended recipient along with an indication that the message may be spam.

39. The medium of claim 28, wherein the instructions are further adapted to perform a message filtering action based upon the results of determining the likelihood that the message is spam, wherein the message filtering action includes delivering a copy of the message to a third party.

40. A system for determining if an electronic message is spam, comprising:
 a. means for automatically identifying a URL included in a received message;
 b. means for fetching information corresponding to the identified URL; and
 c. means for determining if the message containing the URL is likely to be spam.

41. The system of claim 40, further comprising a database.

42. The system of claim 40, further comprising means for calculating a score for the message wherein the score relates the likelihood that the message is spam.

43. The system of claim 40, further comprising means for retrieving information that corresponds to a Uniform Resource Locator from a remote computer through a network.

* * * * *